US 8,428,174 B2

(12) United States Patent
Wang et al.

(10) Patent No.: US 8,428,174 B2
(45) Date of Patent: Apr. 23, 2013

(54) METHOD, PRE-CODING APPARATUS AND WIRELESS COMMUNICATION SYSTEM FOR MULTIPLE-INPUT MULTIPLE-OUTPUT COLLABORATIVE COMMUNICATION

(75) Inventors: Jian Wang, Beijing (CN); Yuantao Zhang, Beijing (CN); Jun Tian, Beijing (CN); Hua Zhou, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/217,914

(22) Filed: Aug. 25, 2011

(65) Prior Publication Data
US 2012/0033723 A1 Feb. 9, 2012

Related U.S. Application Data

(63) Continuation of application No. PCT/CN2010/070770, filed on Feb. 26, 2010.

(30) Foreign Application Priority Data

Feb. 27, 2009 (CN) .......................... 2009 1 0004695

(51) Int. Cl.
*H04B 7/02* (2006.01)
(52) U.S. Cl.
USPC ........... 375/267; 375/260; 375/299; 375/347; 375/349

(58) Field of Classification Search .................. 375/267, 375/260, 299, 347, 349
See application file for complete search history.

(56) References Cited

U.S. PATENT DOCUMENTS

| | | | | |
|---|---|---|---|---|
| 8,064,389 | B2 * | 11/2011 | Khan et al. | 370/329 |
| 2009/0207822 | A1 * | 8/2009 | Kim et al. | 370/338 |
| 2009/0215480 | A1 * | 8/2009 | Kim et al. | 455/501 |
| 2010/0009717 | A1 * | 1/2010 | Monogioudis et al. | 455/562.1 |

* cited by examiner

*Primary Examiner* — Kabir A Timory
(74) *Attorney, Agent, or Firm* — Myers Wolin, LLC

(57) ABSTRACT

A method for multiple-input multiple-output (MIMO) collaborative communication in a wireless communication system includes at least one user equipment and M base stations performing collaborative communication with the user equipment. Here, M is an integer that is greater than or equal to 2. The method includes the following processes for each user equipment: a first level of MIMO pre-coding process is performed for each base station to acquire each first level of pre-coding matrix corresponding to each base station; a second level to the X-th level of MIMO pre-coding process is performed sequentially to acquire the second level to the X-th level of pre-coding matrices of the corresponding base stations. Here, X is an integer that is greater than or equal to 2. A pre-coding device, a user equipment and a wireless communication system related to the method are also provided.

27 Claims, 9 Drawing Sheets

METHOD, PRE-CODING APPARATUS AND WIRELESS COMMUNICATION SYSTEM FOR MULTIPLE-INPUT MULTIPLE-OUTPUT COLLABORATIVE COMMUNICATION

CROSS REFERENCE TO RELATED APPLICATIONS

This is a continuation of Application No. PCT/CN2010/070770 filed on Feb. 26, 2010, now pending, which claims priority to Chinese Patent Application No. 200910004695.X filed on Feb. 27, 2009, the contents of both are herein wholly incorporated by reference.

TECHNICAL FIELD

The present invention generally relates to the field of wireless communication, specifically to a MIMO (MULTIPLE-INPUT MULTIPLE-OUTPUT) collaborative communication method between multiple base stations or multiple cells and the user's device in the wireless communication system, and the present invention also relates to a pre-coding apparatus and wireless communication system.

BACKGROUND OF THE INVENTION

Wireless communication system has been rapidly developed until now. The previous second generation mobile communication system GSM evolves continuously toward such techniques as general packet radio service (GPRS), EDGE with improved data rate, greatly enhancing the data transmission capability of the system. The third generation mobile communication system with higher transmission rate such as wideband code division multiple access (WCDMA, CDMA2000, etc.) has been deployed in many countries and districts in the world and put into commercial use. At the same time with the development of cellular communication techniques, other wireless access techniques such as wireless Local Area Network (WLAN) and Worldwide Interoperability for Microwave Access (WiMAX) have also been rapidly developed. Furthermore, the fourth mobile communication system oriented technique of IEEE 802.16m and the third Generation Partnership Project Long Term Evolution (3GPP LTE), the third Generation Partnership project Long Term Evolution-Advanced (3GPP LTE+), etc., have also been started and entered into the level of research and development.

Demand for high speed multimedia communication and the access service for high speed wireless internet has been increased very fast, and the wireless spectrum resource is limited, therefore it is a problem waiting to be solved how to sufficiently enhance the transmission rate of the communication system and spectrum utilization ratio with use of the available band resource. Considering that multi-antenna technique can improve transmission capacity or signal quality, the above-mentioned various systems all adopt multi-antenna technique, and even an antenna mode including 8 transmission antennas and 8 receiving antennas from the base station to the mobile station has been defined in 3GPP LTE-Advanced system and IEEE 802.16m.

The space-time processing technique of multi-antenna system mainly includes space multiplexing and space diversity, etc. Space diversity is to divide the data into multiple data substreams by space-time encoding and the data substreams are transmitted over multiple antennas, and acquire diversity gain by introducing encoding redundancy in the time domain between the transmission antennas. Space multiplexing is to transmit separate information stream on the transmission antenna, and decode by the receiving terminal using interference suppressing, to thereby achieve maximum rate. Generally speaking, the space multiplexing technique may be used to enhance the throughput of the wireless communication system, while the space diversity technique may be used to enlarge the coverage of the wireless communication system.

In the wireless communication system, due to long distance from the service base station, the users at cell-edge receive a weaker signal from the service base station, and are subjected to a great interference from signals of base stations in nearby cells, thereby deteriorating the system throughput of the users at cell-edge.

Several references and literatures related with MIMO collaborative communication are listed below, which are incorporated herein by reference, as if they were described in detail in the specification.

1. [patent reference 1]: COX TIMOTHY [US]; KHOSHNEVIS AHMAD [US], COOPERATIVE MULTIPLE ACCESS IN WIRELESS NETWORKS (WO2008157147);
2. [patent reference 2]: SHEN MANYUAN [US]; XING GUANBIN [US], Cooperative MIMO in Multicell wireless networks (US2008260064);
3. [patent reference 3]: LI ANXIN [CN]; LI XIANGMING [CN], UPLINK MULTIPLE-INPUT-MULTIPLE-OUTPUT (MIMO) AND COOPERATIVE MIMO TRANSMISSIONS (WO2008124535);
4. [patent reference 4]: MEHTA NEELESH B [US]; ZHANG HONGYUAN [US], System and method for transmitting signals in collaborative base station multi-user MIMO networks (US2007248172);
5. [patent reference 5]: KIM SUNG JIN [KR]; KIM HO JIN [KR], METHOD FOR COOPERATIVE DIVERSITY IN MIMO WIRELESS NETWORK (KR20060111238);
6. [patent reference 6]: KIM SUNG-JIN [KR]; KIM HO-JI [KR], Method of providing collaborative diversity in a MIMO wireless network (US2006239222);
7. [patent reference 7]: PCT application WO2008/151534, entitled "MULTI-ANTENNAE SYSTEM AND DATA TRANSMITTING METHOD", MATTIAS, Wennstrom, et al . . . .
8. [patent reference 8]: Chinese patent application CN101039137A, entitled "Method and system for reducing codebook search-based pre-coding feedback bits of MIMO-OFDM system", YANG BO, etc;
9. [non-patent literature 1]: Ayman F. Naguid, Vahid Tarokh, Nambirajan Seshadri, A. Robert Calderbank, "A Space-Time Coding Modem for High-Data-Rate Wireless Communications," IN IEEE JSAC, vol. 16, no. 8, October 1998, pp. 1459-1478.
10. [non-patent literature 2]: V. Tarokh, N. Seshadri, A. R. Calderbank, "Space-time codes for high data rate wireless communication: performance criterion and code construction", IEEE Trans. Inform. Theory, 44:744-765, March 1998.

SUMMARY OF THE INVENTION

It is an object of the invention to provide a method, apparatus and system for MIMO collaborative communication in a wireless communication system, with an anticipation of enhancing the system throughput for the users at cell-edge in the wireless communication system.

According to a first aspect of the invention, there is provided a method for multiple-input-multiple-output (MIMO) collaborative communication in a wireless communication system, the wireless communication system including at least one user equipment and M base stations collaboratively communicating with the at least one user equipment, M being an integer greater than or equal to 2, said method comprising:

performing the following processes with respect to each user equipment:

performing a first level of MIMO pre-coding process for each base station, to acquire respective first level of pre-coding matrices corresponding to respective base stations;

performing a second level to X-th level of MIMO pre-coding process sequentially to acquire second level to X-th level of pre-coding matrices of respective base stations, X being an integer greater than or equal to 2, wherein in the X-th level of MIMO pre-coding process, the M base stations is divided into $Q^{(X)}$ groups, and the X-th level of MIMO pre-coding is performed to the $Q^{(X)}$ groups of base stations on the basis of the acquired first level to (X−1)-th level of pre-coding matrices to acquire the X-th level of pre-coding matrix of each base station group in the $Q^{(X)}$ base station groups, $Q^{(X)}$ being an integer greater than or equal to 1 and smaller than or equal to M.

According to a second aspect of the invention, there is provided a MIMO pre-coding apparatus used in a wireless communication system for performing multiple-input-multiple-output (MIMO) collaborative communication, the wireless communication system including at least one user equipment and M base stations collaboratively communicating with the at least one user equipment, M being an integer greater than or equal to 2, for each user equipment, said MIMO pre-coding apparatus including:

a first pre-coding matrix generating unit configured to perform a first level of MIMO pre-coding process for each base station to acquire respective first level of pre-coding matrices corresponding to respective base stations; and a second to X-th level of pre-coding matrix generating unit configured to perform a second level to X-th level of MIMO pre-coding process sequentially to acquire a second level to X-th level of pre-coding matrices of respective base stations, X being an integer greater than or equal to 2, wherein the second to X-th level pre-coding matrix generating unit comprises a X-th level of pre-coding matrix generating section configured to: divide the M base stations into $Q^{(X)}$ groups, and perform the X-th level of MIMO pre-coding to the $Q^{(X)}$ groups of base stations on the basis of the acquired first level to (X−1)-th level of pre-coding matrices to acquire the X-th level pre-coding matrix of each group of base station in the $Q^{(X)}$ groups of base stations, $Q^{(X)}$ being an integer greater than or equal to 1 and smaller than or equal to M.

According to a third aspect of the invention, there is provided a user equipment equipped with the above described pre-coding apparatus according to the second aspect of the invention.

According to a fourth aspect of the invention, there is provided a wireless communication system for performing multiple-input-multiple-output (MIMO) collaborative communication, the wireless communication system including:

at least one user equipment according to the above third aspect of the invention; and M base stations for collaboratively communicating with the at least one user equipment, M being an integer greater than or equal to 2.

In the method for performing MIMO collaborative communication in the wireless communication system according to embodiments of the invention, the first level of pre-coding occurs inside a base station or a cell and the subsequent various levels of pre-coding occur between different base stations or cells by performing a hierarchical pre-coding for respective base stations. The method applies a multi-antenna technique to multiple base stations or multiple cells, thereby depressing or utilizing the interference between base stations or cells, enhancing system throughput of the users at cell-edge and improving communication efficiency.

BRIEF DESCRIPTION OF THE DRAWINGS

The foregoing and other objects, features and advantages of the invention will become more apparent from the following description of embodiments of the invention with reference to the drawings. Components in the drawings are not drawn to scale, merely illustrating the principle of the invention. In order to facilitate illustrating and describing some portions of the invention, corresponding portions in the drawings may be enlarged, that is, greater than other components in the illustrative apparatus manufactured according to the invention. In the drawings, identical or like technical features or components will be denoted with identical or like reference numerals.

DETAILED DESCRIPTION OF THE INVENTION

Figure 1:
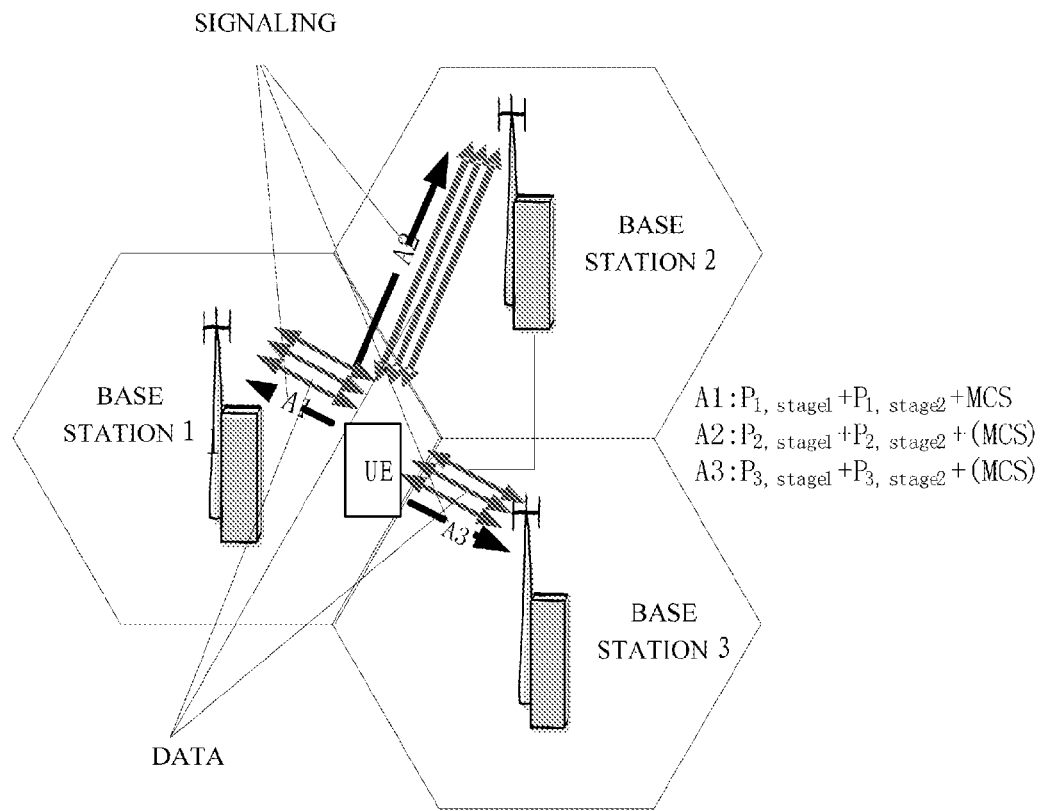
FIG. 1 is a schematic simplified view illustrating the system performing MIMO collaborative communication according to an embodiment of the invention.

Embodiments of the invention will be described below with reference to the drawings. An element and a feature described in a figure of the drawings or one embodiment of the invention can be combined with an element and a feature illustrated in one or more other figures or embodiments. It shall be noted that a representation and a description of components and processes irrelevant to the invention and well known to those ordinarily skilled in the art will be omitted in the drawings and the description for the sake of clarity.

FIG. 1 is a schematic simplified view illustrating the system performing MIMO collaborative communication according to an embodiment of the invention. Although for the sake of simplicity in description, the MIMO collaborative communication system in FIG. 1 is only shown to include 3 base stations and one user equipment UE, each base station corresponds to one cell, each base station includes three transmission antennas, and the user equipment UE has two receiving antennas, the detailed configuration parameters of the system shall not be used to restrict the invention. That is to say, the MIMO collaborative communication system according to the embodiment of the invention may include more than one user equipments and M (M being an integer greater than or equal to 2) base stations collaboratively communicating with these user equipments, one base station may correspond to multiple cells, and the number of antennas that can be owned by each base station and user equipment is not limited to 3 and 2 shown in FIG. 1 and can be any number according to practical condition of the system. For the sake of simplicity, when referring to base station or a cell in the following, description is made only with the base station.

Figure 2:
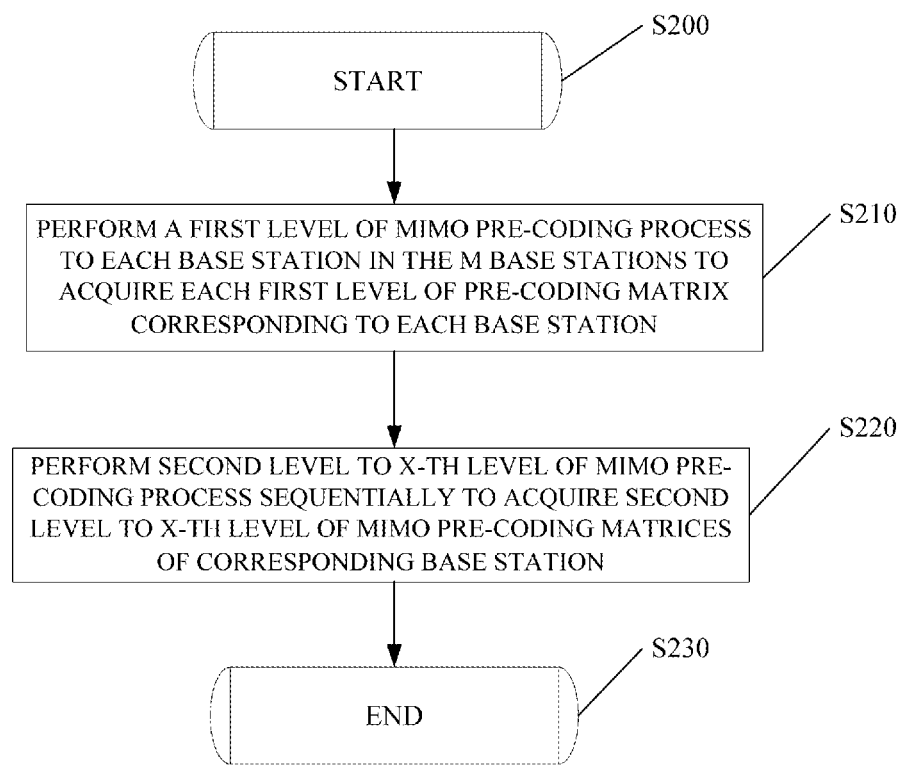
FIG. 2 is a simplified flow chart for a MIMO collaborative communication method in the wireless communication system according to an embodiment of the invention.

A flow of the method for performing MIMO collaborative communication in the wireless communication system according to an embodiment of the invention will be described with reference to FIG. 2. As shown in FIG. 2, the MIMO collaborative communication method includes performing step S210 and step S220 for each user equipment in the wireless communication system. In step S210, a first level of MIMO pre-coding process is performed for each base station to acquire each first level of pre-coding matrix corresponding to each base station. In step S220, the second level to the X-th level MIMO pre-coding process are performed sequentially to acquire the second to the X-th levels of pre-coding matrices for respective base stations, X being an integer greater than or equal to 2. In the X-th level of MIMO pre-coding process, M base stations is divided into $Q^{(X)}$ groups, and on the basis of the acquired first level to the (X−1)-level of pre-coding matrices, the X-th level of MIMO pre-coding is performed to the $Q^{(X)}$ groups of base stations to acquire the X-th level of pre-coding matrix for each group of base stations in the $Q^{(X)}$ groups of base stations. Here, $Q^{(X)}$ is an integer greater than or equal to 1 and less than or equal to M.

MIMO pre-coding is a commonly used space multiplexing technique which improves transmission rate by simultaneous transmission of multi-channel signal on multiple transmission antennas. Pre-coding means that the transmission of a signal is performed after coding (or weighting) of the signal. Transmission of the signal after the pre-coding of the signal may reduce interference between various channels of signals. For the basic concept and principle of the MIMO pre-coding in the MIMO collaborative communication, for example, one can refer to the introduction in the above patent reference 7, which basic concept and principle will not be described again, as these are not what the invention mainly concerns.

Figure 3A:
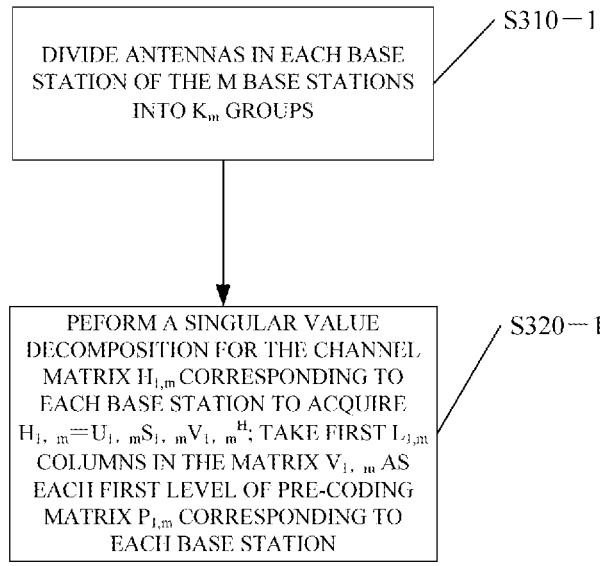
FIG. 3A is a simplified flow chart for a specific implementation for the first level of pre-coding step S210 in the method shown in FIG. 2.

FIG. 3A is a simplified flow chart for a specific implementation for the first level of pre-coding step S210 in the method shown in FIG. 2. As shown in FIG. 3A, antennas in the m-th base station of the M base stations are divided into $K_m$ groups ($K_m$ being an integer greater than or equal to 1 and less than or equal to the number of antenna in the m-th base station). In step S320-1, a singular value decomposition is performed for an channel matrix $H_{1,m}$ corresponding to each base station to acquire $H_{1,m} = U_{1,m} S_{1,m} V_{1,m}^H$. The first $L_{1,m}$ columns in the matrix $V_{1,m}$ is taken as each first level of pre-coding matrix $P_{1,m}$ corresponding to each base station. Here, m=1, 2 ..., M and indicates the serial number of each base station of the M base stations. $U_{1,m}$ and $V_{1,m}$ are unitary matrix, and $S_{1,m}$ is a diagonal matrix and its diagonal elements are channel gains of sub-channels for MIMO channel corresponding to the m-th base station. "H" in $V_{1,m}^H$ indicates an operation of Hamiltonian transposition, $L_{1,m}$ indicates the number of equivalent antenna of $K_m$ antenna groups in the m-th base station, which is an integer greater than or equal to 1 and less than or equal to the number of the antenna of the user equipment.

As can be seen from the above, the first level of pre-coding process is to acquire each first level of pre-coding matrix for each base station in the M base stations, which process corresponds to making the divided $K_m$ groups of antennas in the m-th base station equivalent to $L_{1,m}$ antennas, and the similar first level of pre-coding process is performed to all M base stations, so as to make preparations for the subsequent MIMO pre-coding process and reduce complexity of the whole MIMO pre-coding process. The number of equivalent antenna is the number of the columns of a matrix acquired by multiplying the channel impulse response of each antenna group by the pre-coding matrix corresponding to the antenna group.

Figure 3B:
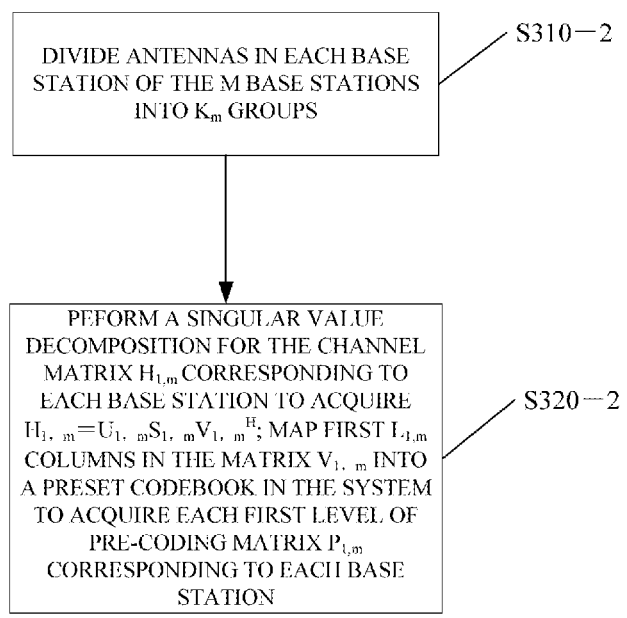
FIG. 3B is a simplified flow chart for another specific implementation for the first level of pre-coding step S210 in the method shown in FIG. 2.

FIG. 3B is a simplified flow chart for another specific implementation for the first level of pre-coding step S210 in the method shown in FIG. 2. As shown in FIG. 3B, antennas in the m-th base station in M base stations is divided into $K_m$ groups ($K_m$ being an integer greater than or equal to 1 and less than or equal to the number of antenna in the m-th base station). In step S320-2, a singular value decomposition is performed for the channel matrix $H_{1,m}$ corresponding to each base station to acquire $H_{1,m} = U_{1,m} S_{1,m} V_{1,m}^H$. A matrix composed of the first $L_{1,m}$ columns in the matrix $V_{1,m}$ is mapped into a preset codebook in the wireless communication system, and the codebook vector acquired by such mapping is taken as each first level of pre-coding matrix $P_{1,m}$ corresponding to each base station. Here, m=1, 2 ..., M and indicates the serial number of each base station in the M base stations. $U_{1,m}$ and $V_{1,m}$ are unitary matrix, and $S_{1,m}$ is a diagonal matrix and its diagonal elements are channel gains of sub-channels for the MIMO channel corresponding to the m-th base station. "H" in $V_{1,m}^H$ indicates an operation of Hamiltonian transposition, and $L_{1,m}$ indicates the number of equivalent antenna of the $K_m$ antenna groups in the m-th base station, which is an integer greater than or equal to 1 and less than or equal to the number of antenna of the user equipment. This first level of pre-coding process is also to acquire each first level of pre-coding matrix for each base station in the M base stations, which process corresponds to making the divided $K_m$ groups of antennas in the m-th base station equivalent to $L_{1,m}$ antennas. The similar first level OF pre-coding process is performed to all M base stations.

As can be easily seen, the first level of pre-coding process shown in FIG. 3A is different from that in FIG. 3B in: respective first level of pre-coding matrices are acquired by performing the singular value decomposition (SVD) to the channel matrix of each base station in the first level pre-coding process shown in FIG. 3A, while respective first level of pre-coding matrices of each base station are acquired by a codebook-based method in the first level of pre-coding process shown in FIG. 3B.

In the singular value decomposition (SVD), assuming there is a matrix $H_{A \times B}$ with A rows and B columns, and the matrix can certainly be decomposed into the following with the SVD: $H=USV^H$. Here, U is a unitary matrix with A rows and A columns, S is a diagonal matrix with A rows and B columns, V is a unitary matrix with B rows and B columns, and "H" in $H=USV^H$ indicates an operation of Hamiltonian transposition. The SVD is a well-known method in the field of mathematics and engineering. For example, one can obtain the introduction to the SVD in the field of communication by referring to the above-mentioned patent reference 7. Since the content of the SVD is not the main concern of the present invention, the detailed description thereof will be omitted here.

A codebook is a set of pre-coding matrices preset by the communication system. The basic concept and principle regarding the codebook and the codebook-based pre-coding are well known in the art (see, for example, related introductions of the codebook and codebook-based pre-coding in the above-mentioned patent reference 8). Since the basic concept and principle regarding the codebook and the codebook-based pre-coding are not what the invention mainly concerns, the detailed descriptions thereof will be omitted.

As an example for the first level of pre-coding based on the codebook as shown in FIG. 3B, in the mapping process of the above step S320-2, a correlation operation may be performed between a matrix composed of the first $L_{1,m}$ columns in the matrix $V_{1,m}$ and the respective pre-coding matrices in the codebook, and the pre-coding matrix in the codebook corresponding to the maximum correlation value may be taken as each first level pre-coding matrix $P_{1,m}$ corresponding to each base station. This method of acquiring the pre-coding matrix based on the codebook may be referred to as "mapping method".

A specific example for selecting one vector among the known vector codebooks in the case of knowing one vector will be given next.

Assuming that the following one codebook is known.

$$\text{codebook} = \begin{matrix} -0.0878 + 0.4748i & 0.3457 + 0.2078i & -0.7558 + 0.2299i & -0.0723 - 0.6116i \\ 1.0534 - 0.8538i & 0.7316 - 0.5567i & -0.5724 - 0.5338i & -0.1707 - 0.0212i \\ 0.9963 + 0.5072i & 0.5140 + 0.6282i & -2.0819 + 0.9689i & 0.2257 - 0.1166i \\ 1.0021 + 1.1528i & -0.2146 - 0.8111i & 1.0171 - 1.2102i & 0.2212 + 0.4439i \end{matrix}$$

And one column vector b is known.
b=
0.7731−0.8585i
0.7844−0.7874i
−0.6107−0.0048i
0.0547+1.0837i A correlation operation for acquiring a modulus is performed, that is:

$C=\text{abs}(b'^*\text{codebook})=[1.9270\ 0.4177\ 3.2119\ 1.0901]$

It can be seen from the above that, the value of the modulus obtained by performing the correlation operation between the third column vector of the codebook and the vector b is the largest, which is 3.2119. Then, the third column vector of the codebook is the vector to be selected according to the above operation. Here, $C=\text{abs}(b'^*\text{codebook})$ indicates that the correlation operation is made first, then the modulus value is acquired, and b' refers to a conjugate transform of the column vector b.

Furthermore, as still another specific implementation (not shown in the drawings) for the first level of pre-coding step S210 in the method shown in FIG. 2, a preset codebook of the wireless communication system may be searched, according to a predetermined principle, based on the channel matrix $H_{1,m}$ corresponding to each base station, and the codebook vector acquired by the searching is taken as each first level of pre-coding matrix $P_{1,m}$ corresponding to each base station. Here, m=1, 2 . . . , M and represents the serial number of each base station in the M base stations. The method of acquiring the pre-coding matrix based on codebook may be referred to as "exhaustive method". The codebook search may be performed according to one of SNR (signal to noise ratio) maximization criterion for the receiving signal, maximum likelihood criterion, minimum mean-square error criterion, channel capacity maximum criterion, etc. as desired.

A specific implementation for the X-th level of pre-coding of step S220 in the method shown in FIG. 2 will be described with reference to FIGS. 4A-4C.

Figure 4A:
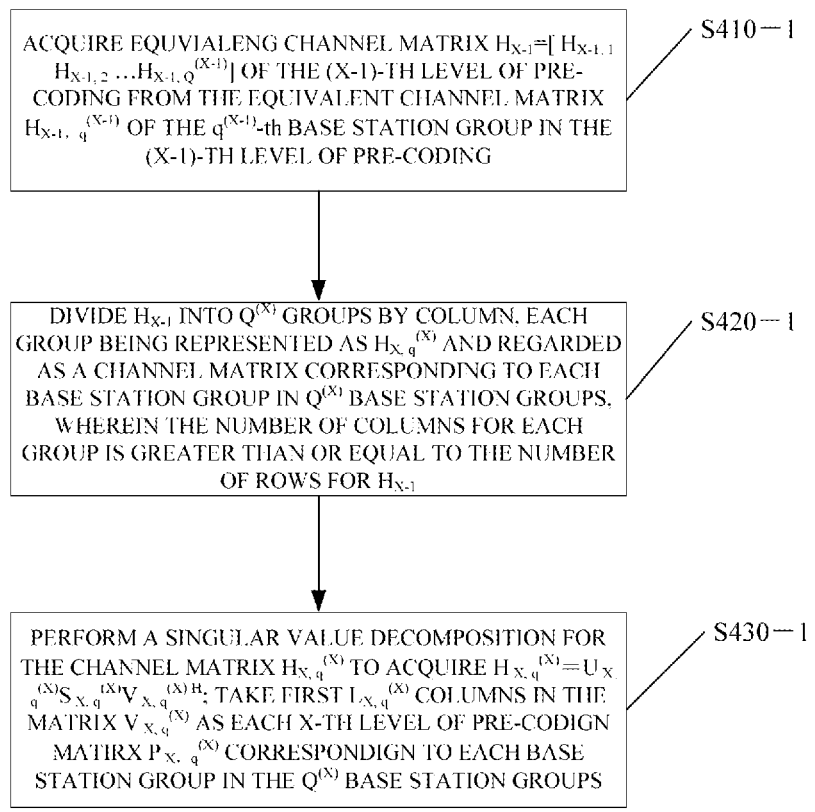
FIG. 4A is a simplified flow chart for a specific implementation for the X-th level of pre-coding step S220 in the method shown in FIG. 2.

FIG. 4A shows a specific implementation for the X-th level of pre-coding step S220 in the method shown in FIG. 2. As shown in FIG. 4A, in step S410-1, an equivalent channel matrix $H_{X-1,q}^{(X-1)}$ of the $q^{(X-1)}$-th base station group in the (X−1)-th level pre-coding is acquired through multiplying the pre-coding matrix $P_{X-1,q}^{(X-1)}$ for the $q^{(X-1)}$-th base station group in the $Q^{(X-1)}$ base station groups in the (X−1)-th level pre-coding matrix by the channel matrix of the $q^{(X-1)}$-th base station group. Here, $q^{(X-1)}$ is the serial number of each base station group in the $Q^{(X-1)}$ base station groups, which is an integer larger or equal to 1 and smaller than or equal to $Q^{(X-1)}$, and the equivalent channel matrix of the (X−1)-th level of pre-coding is represented as $H_{X-1}=[H_{X-1,1}\ H_{X-1,2}\ \cdots\ H_{X-1,Q^{(X-1)}}]$. In step S420-1, $H_{X-1}$ is divided into $Q^{(X)}$ groups by column, each group is represented as $H_{X,q}^{(X)}$ and regarded as a channel matrix corresponding to each base station group in $Q^{(X)}$ base station groups, and the number of columns for each group is greater than or equal to the number of rows for $H_{X-1}$. In step S430-1, the singular value decomposition is performed for the channel matrix $H_{X,q}^{(X)}$ to acquire $H_{X,q}^{(X)}=U_{X,q}^{(X)}S_{X,q}^{(X)}V_{X,q}^{(X)H}$, and the first $L_{X,q}^{(X)}$ columns in the matrix $V_{X,q}^{(X)}$ is taken as each X-th level of pre-coding matrix $P_{X,q}^{(X)}$ corresponding to the each base station in the $Q^{(X)}$ base station groups. Here, $q^{(X)}=1, 2 \ldots, Q^{(X)}$ and indicates the serial number of each base station group in the $Q^{(X)}$ base station groups acquired by dividing the M base stations in the X-th level of MIMO pre-coding process, $U_{X,q}^{(X)}$ and $V_{X,q}^{(X)}$ are unitary matrices, and $S_{X,q}^{(X)}$ is a diagonal matrix and its diagonal elements are channel gains of sub-channels for the MIMO channel corresponding to the $q^{(X)}$ base station group. "H" in $V_{X,q}^{(X)H}$ indicates an operation of a Hamiltonian transposition, and $L_{X,q}^{(X)}$ indicates the number of passages for parallel transmission provided by the channel of the $q^{(X)}$-th base station group in the $Q^{(X)}$ base station groups in the X-th level of pre-coding, which is an integer greater than or equal to 1 and less than the number of antenna of the user equipment.

Figure 4B:
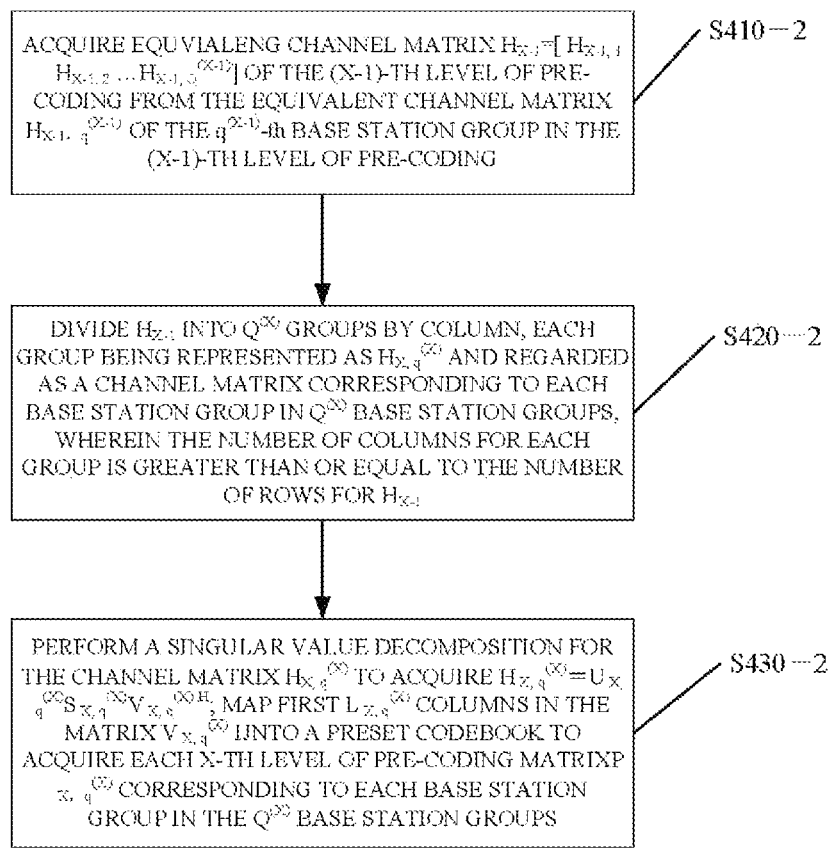
FIG. 4B is a simplified flow chart for another specific implementation for the X-th level of pre-coding step S220 in the method shown in FIG. 2.

FIG. 4B shows another specific implementation for the X-th level of pre-coding step S220 in the method shown in FIG. 2. As shown in FIG. 4B, the processing in steps S410-2 and S420-2 in this implementation is similar with that in steps S410-1 and S420-1 in the implementation of FIG. 4A, with the difference lying in that in step S430-2, after acquiring $H_{X,q}^{(X)} = U_{X,q}^{(X)} S_{X,q}^{(X)} V_{X,q}^{(X)H}$ by performing the singular value decomposition to the channel matrix $H_{X,q}^{(X)}$, the matrix composed of the first $L_{X,q}^{(X)}$ columns in the matrix $V_{X,q}^{(X)}$ is mapped into the preset codebook in the wireless communication system, and the codebook vector acquired by the mapping is regarded as each X-th level of pre-coding matrix $P_{X,q}^{(X)}$ corresponding to each base station group in the $Q^{(X)}$ base station groups. That is to say, in the implementation shown in FIG. 4A, each X-th level of pre-coding matrix corresponding to each base station group is acquired by the singular value decomposition method, while in the implementation shown in FIG. 4B, the X-th level of pre-coding matrix corresponding to each base station group is acquired through the above "mapping method" based on codebook.

As an example of the X-th level of pre-coding method based on codebook as shown in FIG. 4B, in the mapping process of the above step S430-2, a correlation operation may be performed between a matrix composed of the first $L_{X,q}^{(X)}$ columns in the matrix $V_{X,q}^{(X)}$ and respective pre-coding matrices in the codebook, and the pre-coding matrix in the codebook corresponding to the maximum correlation value is taken as each X-th level of pre-coding matrix $P_{X,q}^{(X)}$ corresponding to each base station group in the $Q^{(X)}$ base station groups.

Figure 4C:
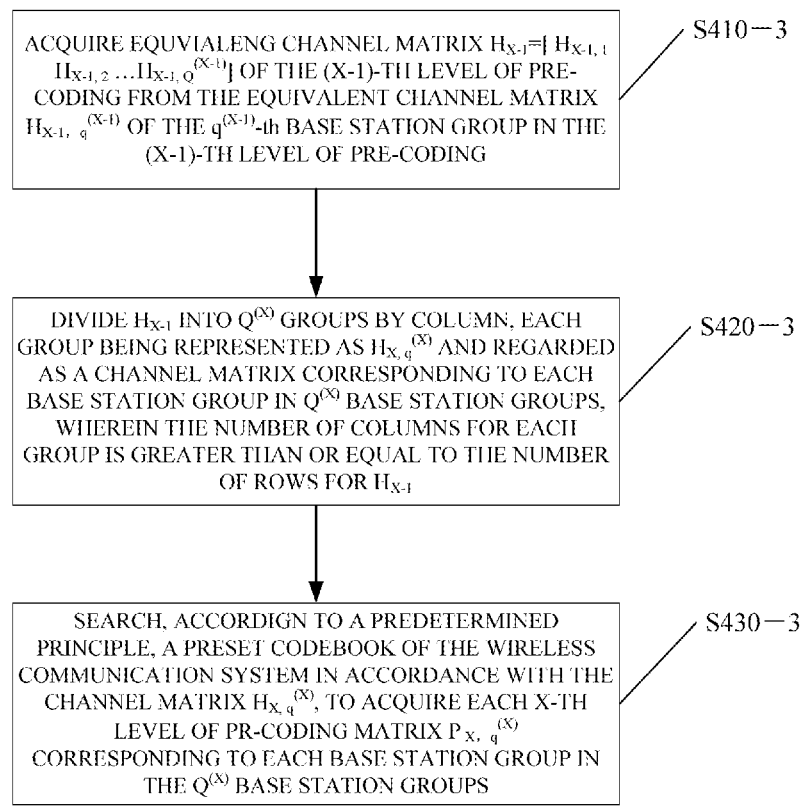
FIG. 4C is a simplified flow chart for still another specific implementation for the Xth level of pre-coding step S220 in the method shown in FIG. 2.

FIG. 4C shows still another specific implementation for the X-th level of pre-coding step S220 in the method shown in FIG. 2. As shown in FIG. 4C, the processing in steps S410-3 and S420-3 in this implementation is similar with that in steps S410-1 and S420-1 in the implementation of FIG. 4A, with the difference lying in that in step S430-3, after acquiring the channel matrix $H_{X,q}^{(X)}$ corresponding to each base station group in the $Q^{(X)}$ base station groups in step S420-3, according to a predetermined principle, a preset codebook of the wireless communication system is searched based on the channel matrix $H_{X,q}^{(X)}$, and the codebook vector acquired by the searching is regarded as each X-th level of pre-coding matrix $P_{X,q}^{(X)}$ corresponding to each base station group in the $Q^{(X)}$ base station group. In this implementation, the X-th level of pre-coding matrix of corresponding base station group is actually acquired by the above "exhaustive method" based on codebook.

As can be seen from the description of FIGS. 4A-4C, the process of the X-th level of pre-coding is equivalent to performing, on the basis of the former first to the (X−1)-th levels of pre-coding, MIMO pre-coding process with M base stations being divided into $Q^{(X)}$ base stations groups and each base station group being regarded as one base station. Therefore, the interference between the base stations may be taken into consideration, and the system throughput of the user equipment may be improved by utilizing the interference, thereby enhancing communication efficiency of the wireless communication system.

In the multi-level (that is, X levels) of pre-coding process of the above MIMO collaborative communication method according to the embodiments of the invention, the larger the value of the parameter L is, the better the performance of the pre-coding is, while the higher the complexity of the pre-coding computation becomes. In respective levels of pre-coding process, L shall be smaller than the number of the transmission antenna of the user equipment.

After acquiring the first level of pre-coding matrix $P_{1,m}$ to the X-th level of pre-coding matrix $P_{X,q}^{(X)}$, a posterior signal to noise ratio under the action of the current channel and the first level of pre-coding matrix $P_{1,m}$ to the X-th level of pre-coding matrix $P_{X,q}^{(X)}$ is determined according to the above information and a channel impulse response of the current channel of the wireless communication system, and one of various modulation coding schemes (MCS) known by the wireless communication system is selected according to the posterior signal to noise ratio. One (for example, the service base station of the user equipment) or several of the M base stations are notified of the acquired first level of pre-coding matrix $P_{1,m}$ to the X-th level of pre-coding matrix $P_{X,q}^{(X)}$ and the selected modulation coding scheme, and the one or several of M base stations transmit the received information to other corresponding base stations in the M base stations. Alternatively, respective base stations of the M base stations are notified of the acquired first level of pre-coding matrix $P_{1,m}$ to the X-th level of pre-coding matrix $P_{X,q}^{(X)}$ and the selected modulation coding scheme, so that the M base stations can complete the transmission pre-coding process of each base station in the MIMO collaborative communication according to the acquired first level of pre-coding matrix $P_{1,m}$ to the X-th level of pre-coding matrix $P_{X,q}^{(X)}$ corresponding to the each base station.

The above respective levels of pre-coding matrices and MCSs may be acquired through the computation by the user equipment, and forwarded through corresponding signaling channels between the user equipment and the M base stations. The information between various base stations may be transmitted through a backhaul link.

It should be understood by those skilled in the art that the computation and/or transmission of various levels of pre-coding matrices and MCSs may also be performed by another device than the user equipment in the collaborative communication system, as long as such device can acquire information required for the computation of various levels of pre-coding matrices and MCSs, and can communicate with the base station and/or the user equipment.

Multi-levels of pre-coding process in the MIMO collaborative communication method according to the embodiments of the invention have been described with respect to one user equipment. In the case that there are multiple user equipments in the collaborative communication system, the above multi-levels of pre-coding process may be similarly performed with respect to every user, thereby implementing MIMO collaborative communication related with the multiple user equipments. This MIMO collaborative communication may improve system throughput of each user equipment, enhancing communication efficiency.

In order to help further understand the MIMO collaborative communication method according to the embodiments of the invention, a specific example is given as follows.

In this example, assuming that there are one user equipment and M base stations or cells in the system that are involved in the MIMO multipoint collaborative communication, the numbers of the transmission antennas of respective base stations or cells are $N_{t1}, N_{t2}, \ldots, N_{tM}$, and the number of the receiving antenna of the user equipment is $N_r$. Two levels of pre-coding processes are performed. In the first level of pre-coding process, all antennas in each base station is grouped into one group, and in the second level of pre-coding process, all M base stations are grouped into one group. That is, in the MIMO collaborative communication method according to the embodiments of the invention, the parameters $K_m=1$, $X=2$, $Q^{(X)}=1$.

The antenna group of the same base station or the same cell is referred to as $H_1, H_2, \ldots, H_M$. Assuming that the channel impulse response from transmission antenna of each base station or cell to the user equipment is $$H_m = \begin{bmatrix} h_{1,1} & h_{1,2} & \ldots & h_{1,N_{tm}} \\ h_{2,1} & h_{2,2} & \ldots & h_{2,N_{tm}} \\ \vdots & \vdots & \ldots & \vdots \\ h_{N_r,1} & h_{N_r,2} & \ldots & h_{N_r,N_{tm}} \end{bmatrix}.$$

Here, $h_{r,t}$ represents an impulse response of the channel from the t-th transmission antenna of the m-th base station or cell to the r-th receiving antenna. The channel impulse response from the transmission antennas of all base stations or cells to the mobile station is $$H = \begin{bmatrix} h_{1,11} & h_{1,12} & \ldots & h_{1,1N_{tm}} & h_{1,21} & h_{1,22} & \ldots & h_{1,2N_{tm}} & \ldots & h_{1,M1} & h_{1,M2} & \ldots & h_{1,MN_{tm}} \\ h_{2,11} & h_{2,12} & \ldots & h_{2,1N_{tm}} & h_{2,21} & h_{2,22} & \ldots & h_{2,2N_{tm}} & \ldots & h_{2,M1} & h_{2,M2} & \ldots & h_{2,MN_{tm}} \\ \vdots & \vdots & \ldots & \vdots & \vdots & \vdots & \ldots & \vdots & & \vdots & \vdots & \ldots & \vdots \\ h_{N_r,11} & h_{N_r,12} & \ldots & h_{N_r,1N_{tm}} & h_{N_r,21} & h_{N_r,22} & \ldots & h_{N_r,2N_{tm}} & & h_{N_r,M1} & h_{N_r,M2} & \ldots & h_{N_r,MN_{tm}} \end{bmatrix},$$

which may also be represented as $H=[H_1\ H_2\ \ldots\ H_M]$.

The first level of pre-coding process is firstly described.

In the first level of pre-coding process, the user equipment performs the singular value decomposition to each $H_m$, that is:

$$H_m = U_{m[N_r \times N_r]} S_{m[N_r \times (N_{t1}+N_{t2}+N_{tM})]} V_{m[(N_{t1}+N_{t2}+N_{tM}) \times (N_{t1}+N_{t2}+N_{tM})]}$$

According to actual requirements of the system, the first column or first several columns from $V_{m[(N_{t1}+N_{t2}+N_{tM}) \times (N_{t1}+N_{t2}+N_{tM})]}$ may be taken as the first level of pre-coding matrix $P_{1m}$ of each base station. And at last the first level of pre-coding equivalent matrix of the channel $H_{s1} = [H_{s1,1}\ H_{s1,2} \ldots H_{s1,M}]$ is acquired. Here, $H_{s1,m} = H_m P_{1m}$ m=1, 2, ..., M. The first level of pre-coding matrix $P_{1m}$ is acquired through the singular value decomposition (SVD).

As an alternative embodiment, a correlation operation may be performed between the acquired first level of pre-coding matrix $P_{1m}$ m=1, 2, ..., M and each pre-coding matrix in the set of pre-coding matrices (namely the codebook) known by the system, and the pre-coding matrix corresponding to the maximum correlation value is taken as each first level of pre-coding matrix of each base station to be acquired, which is referred to as $P_{1m}'$ m=1, 2, ..., M. And at last the first level of pre-coding equivalent matrix of the channel $H'_{s1} = [H'_{s1,1}\ H'_{s1,2} \ldots H'_{s1,M}]$ is acquired. Here, $H'_{s1,m} = H_m P'_{1m}$ m=1, 2, ..., M. The first level of pre-coding matrix $P_{1m}'$ is acquired through the "mapping method" base on codebook.

As another alternative embodiment, the first level of pre-coding matrix $P_{1m}''$, m=1, 2, ..., M of each base station may also be acquired through the above "exhaustive method" based on codebook. At last the first level of pre-coding equivalent matrix of the channel $H_{s1}'' = [H_{s1,1}'', H_{s1,2}'', \ldots, H_{s1,M}'']$ is acquired. Here, $H_{s1,m}'' = H_m P_{1m}''$, m=1, 2, ..., M. The first level of pre-coding matrix $P_{1m}''$ is acquired through the "exhaustive method" based on codebook.

The second level pre-coding process will be described next.

In the case that the first level of pre-coding matrix $P_{1m}$ is acquired through the singular value decomposition (SVD) in the first level of pre-coding process, in the second level of pre-coding process, the second level of pre-coding matrices corresponding to the M base stations may be acquired respectively through the method based on SVD, the "mapping method" based on codebook and the "exhaustive method" based on codebook as specified below.

The method Based on SVD

The user equipment performs the singular value decomposition to $H_{s1}$, that is, $H_{s1} = U_{[N_r \times N_r]} S_{[N_r \times (M \times R)]} V_{[(M \times R) \times (M \times R)]}^H$. Here, R the value of the rank value, i.e. the number of columns of the pre-coding matrix $P_m$.

According to actual system requirements, the first R columns of $V_{[(M \times R) \times (M \times R)]}$ may be taken as the second level of pre-coding matrices P2 corresponding to the M base stations. And at last the second level of pre-coding equivalent matrix of the channel $H_{s2} = H_{s1} P_2$ acquired. This is to acquire the second level of pre-coding matrix P2 through the singular value decomposition (SVD).

The "Mapping Method" Based on Codebook

As an alternative embodiment, a correlation operation may be performed between the above pre-coding matrix P2 acquired by the SVD and each pre-coding matrix in the set of pre-coding matrices (namely the codebook) known by the system, and the pre-coding matrices corresponding to the maximum correlation value are taken as the second level of pre-coding matrices to be acquired corresponding to the M base stations, which is referred to as $P_2'$. And at last the second level of pre-coding equivalent matrix $H_{s2}' = H_{s1} P_2'$ of the channel is acquired. This is to acquire the second level of pre-coding matrix $P_2'$ through the "mapping method" based on codebook.

An "Exhaustive Method" Based on Codebook

As still another alternative embodiment, the second level of pre-coding matrices $P_2''$ corresponding to the M base stations may also be acquired by the above "exhaustive method" based on codebook. And the second level of pre-coding equivalent matrix $H_{s2}'' = H_{s1} P_2''$ of the channel is acquired at last. This is to acquire the second level of pre-coding matrix $P_2''$ through the "exhaustive method" based on codebook.

Similarly, for the case of acquiring the first level of pre-coding matrices $P_{1m}'$ through the "mapping method" based on codebook in the first level of pre-coding process, and for the case of acquiring the first level of pre-coding matrices $P_{1m}''$ through the "exhaustive method" based on codebook in the first level of pre-coding process, the second level of pre-coding matrices may also be acquired respectively through the method based on SVD, the "mapping method" based on codebook and the "exhaustive method" based on codebook as specified above. The details of these methods will be omitted for the sake of concision.

After corresponding first level of pre-coding matrices and second level of pre-coding matrices are acquired, they can be transmitted to each base station or cell through a signaling channel between the user equipment and each base station or cell. For example, for the first level of pre-coding matrices $P_{11}, P_{12}, \ldots, P_{1M}$, all the first level of pre-coding matrices may be transmitted to one of all the collaborative base stations or cells (for example, a service base station of user equipment), and the service base station transmits the corresponding first level of pre-coding matrix to the corresponding base station or cell. Alternatively, all the first level of pre-coding matrices may be transmitted to several or all of the collaborative base stations or cells, and the corresponding first level of pre-coding matrix is transmitted to the corresponding base station or cell through the communication between correlated base stations or cells. Alternatively, the corresponding first level of pre-coding matrix may only be transmitted to the corresponding base station or cell, for example, $P_{11}$ is transmitted to No. 1 base station or cell, $P_{12}$ is transmitted to No. 2 base station or cell, and $P_{1M}$ is transmitted to No. M base station or cell, etc. For example, for the second level of pre-coding matrices $P_2$, it may be transmitted, through the similar way as the above method of transmitting the first level of pre-coding matrix, to one of all the collaborative base stations or cells, or transmitted to several or all of all the collaborative base stations or cells, or only corresponding elements in the second level of pre-coding matrices may be transmitted to corresponding base stations or cells. Therefore, each base station may respectively perform pre-coding process according to the acquired corresponding first level of pre-coding matrices and second level of pre-coding matrices. For example, in the MIMO collaborative communication system shown in FIG. 1, signaling channels A1, A2 and A3 between the user equipment and base station 1, base station 2 and base station 3 respectively are given. Information among respective base stations is transmitted through a backhaul link.

For the above case of acquiring the first level of pre-coding matrices $P_{1m}'$ m=1, 2, ..., M, $P_{1m}''$, m=1, 2, ..., M, and the second level of pre-coding matrices $P_2'$ and $P_2''$ in other ways, the generated respective levels of pre-coding matrices can be transmitted to corresponding base station with a similar way with the above one.

The user equipment determines a posterior signal to noise ratio under the action of the current channel and pre-coding matrix according to the first level of pre-coding matrices and the second level of pre-coding matrices and the channel impulse response of the current channel, selects one of the various modulation coding schemes (MCS) known by the system according to the posterior signal to noise ratio, and transmits the modulation coding scheme to one of various corresponding base stations or cells through a signaling channel between the user equipment and each base station. The selected modulation coding scheme may also be transmitted to several or all of the various corresponding base stations or cells through the signaling channel. The selected MCS may be transmitted with a similar way of transmitting the first level of pre-coding matrices and the second level of pre-coding matrices.

A pre-coding apparatus for performing MIMO collaborative communication in a wireless communication system according to an embodiment of the invention will be described with reference to FIGS. 5-7.

Figure 5:
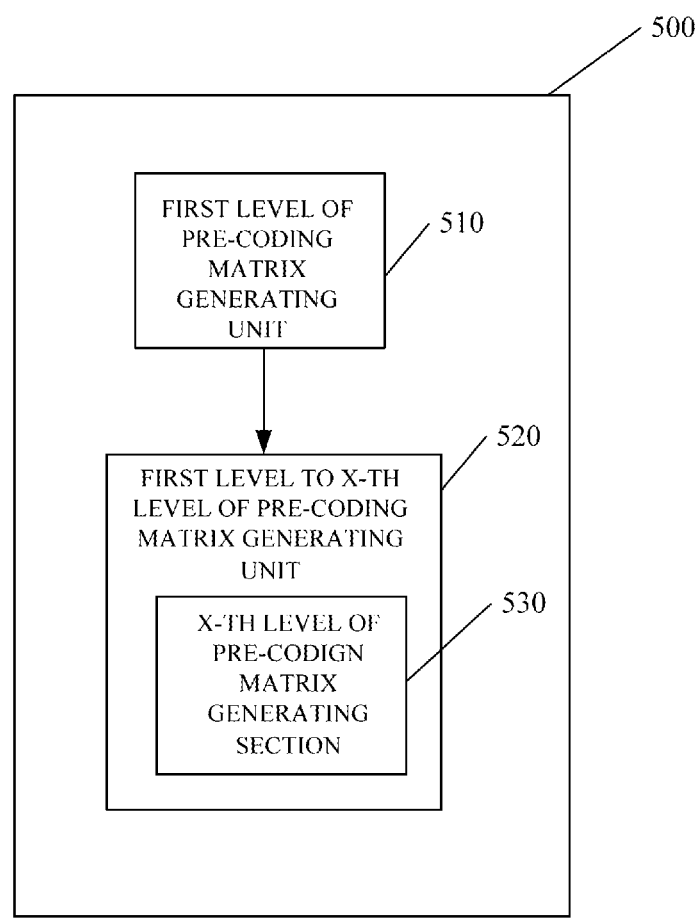
FIG. 5 is a schematic block view of a pre-coding apparatus for performing MIMO collaborative communication in the wireless communication system according to an embodiment of the invention.

FIG. 5 shows a schematic block view of a pre-coding apparatus 500 for performing MIMO collaborative communication in the wireless communication system according to an embodiment of the invention. The wireless communication system includes at least one user equipment and M base stations collaboratively communicating with the at least one user equipment. Here, M is an integer greater than or equal to 2. As shown in FIG. 5, for each user equipment, the MIMO pre-coding apparatus 500 includes: a first level pre-coding matrix generating unit 510 configured to perform a first level of MIMO pre-coding process for each base station to acquire each first level of pre-coding matrix corresponding to each base station; a second level to X-th level of pre-coding matrix generating unit 520 configured to sequentially perform a second level to X-th level of MIMO pre-coding process to acquire the second level to the X-th level of pre-coding matrices of corresponding base station. Here, X is an integer being greater than or equal to 2. The second level to the X-th level of pre-coding matrix generating unit 520 includes an X-th level of pre-coding matrix generating section 530 configure to divide the M base stations into $Q^{(X)}$ groups, and perform the X-th level of MIMO pre-coding to the $Q^{(X)}$ base station groups on the basis of the acquired first level to the (X−1)-th level of pre-coding matrices, to thereby acquire the X-th level of pre-coding matrices of each base station group in the $Q^{(X)}$ base station groups. Here, $Q^{(X)}$ is an integer being greater than or equal to 1 and smaller than or equal to M.

Figure 6A:
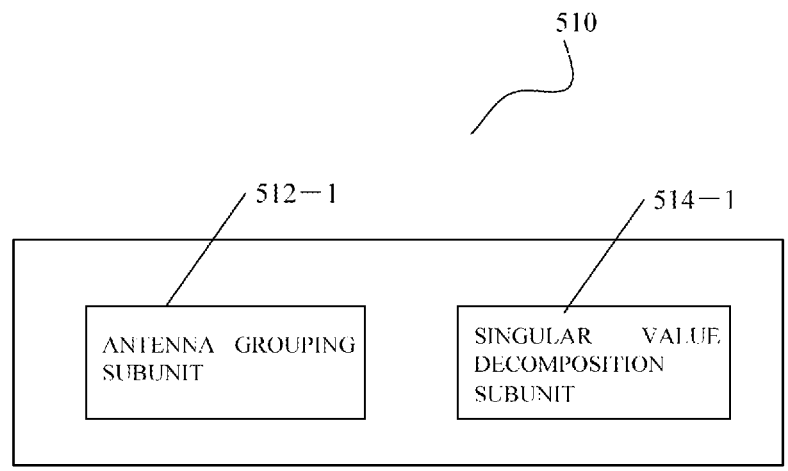
FIG. 6A is a schematic block view for a specific implementation for the first level of pre-coding matrix generating unit 510 in the pre-coding apparatus as shown in FIG. 5.

FIG. 6A shows a schematic block view of a specific implementation for the first level of pre-coding matrix generating unit 510 in the pre-coding apparatus shown in FIG. 5. As shown in FIG. 6A, the first level of pre-coding matrix generating unit 510 includes an antenna grouping subunit 512-1 and a singular value decomposition subunit 514-1. For example, these subunits may be configured to perform respectively the processing of step S310-1 and S320-1 in the method shown in FIG. 3A.

Figure 6B:
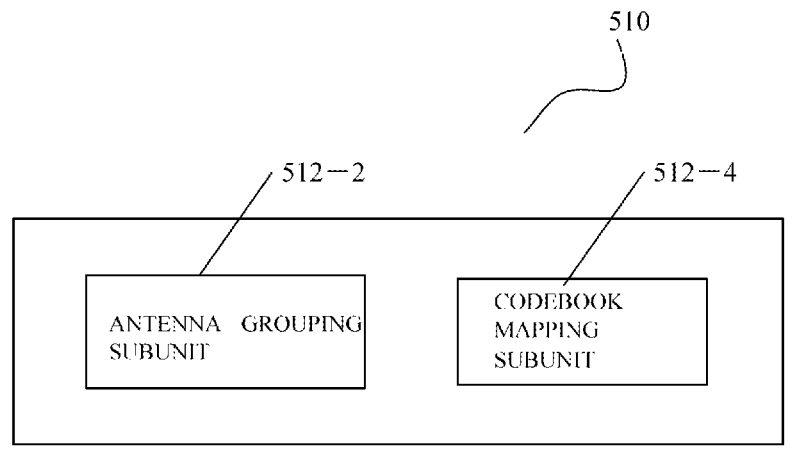
FIG. 6B is a schematic block view for another specific implementation for the first level of pre-coding matrix generating unit 510 in the pre-coding apparatus as shown in FIG. 5.

FIG. 6B shows a schematic block view of another specific implementation for the first level of pre-coding matrix generating unit 510 in the pre-coding apparatus shown in FIG. 5. As shown in FIG. 6B, the first level of pre-coding matrix generating unit 510 includes an antenna grouping subunit 512-2 and a codebook mapping subunit 514-2. For example, these subunits may be configured to perform respectively the processing of step S310-2 and S320-2 in the method shown in FIG. 3B.

Figure 7A:
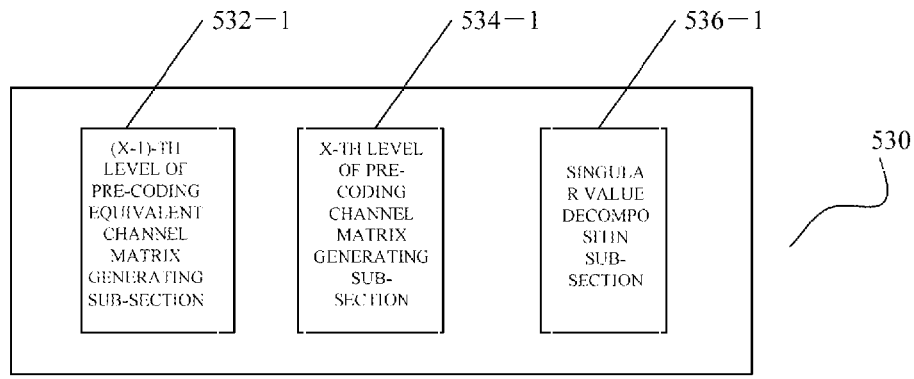
FIG. 7A is a schematic block view for a specific implementation for the X-th level of pre-coding matrix generating unit 530 in the pre-coding apparatus as shown in FIG. 5.

FIG. 7A shows a schematic block view of a specific implementation for the X-th level of pre-coding matrix generating unit 530 in the pre-coding apparatus shown in FIG. 5. As shown in FIG. 7A, the X-th level of pre-coding matrix generating unit 530 includes a (X−1)-th level of pre-coding equivalent channel matrix generating subunit 532-1, a Xth level of pre-coding equivalent channel matrix generating subunit 534-1, and a singular value decomposition subunit 536-1. For example, these subunits may be configured to perform respectively the processing of step S410-1, S420-1 and S430-1 in the method shown in FIG. 4A.

Figure 7B:
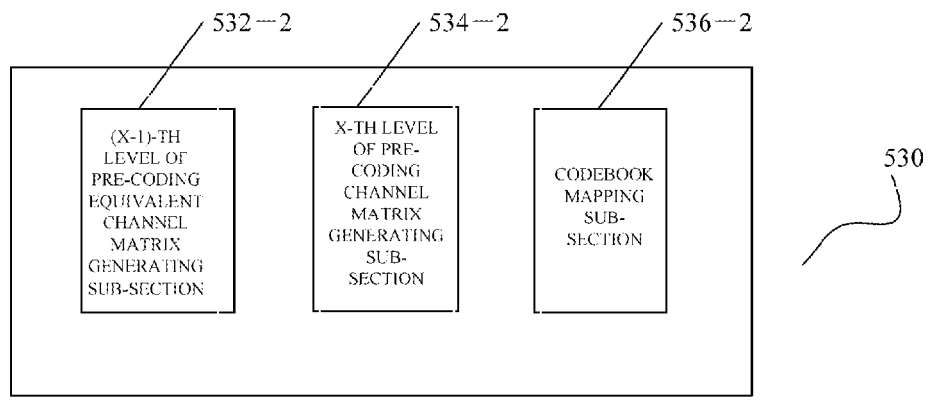
FIG. 7B is a schematic block view for another specific implementation for the X-th level of pre-coding matrix generating unit 530 in the pre-coding apparatus as shown in FIG. 5.
Figure 7C:
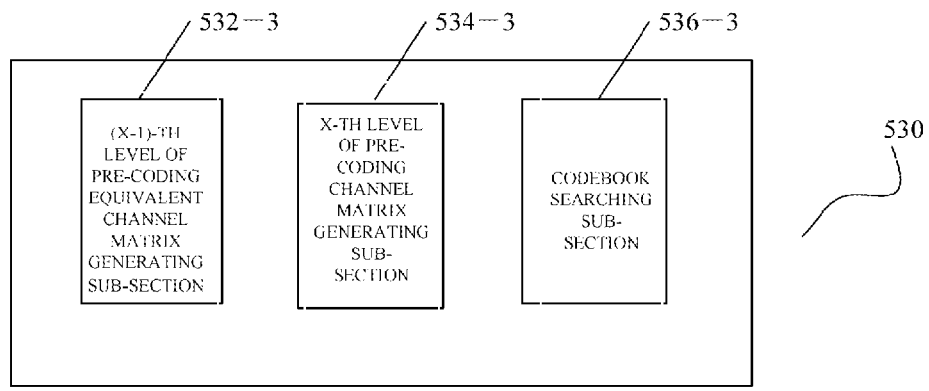
FIG. 7C is a schematic block view for still another specific implementation for the X-th level of pre-coding matrix generating unit 530 in the pre-coding apparatus as shown in FIG. 5.

FIG. 7B shows a schematic block view of another specific implementation for the X-th level of pre-coding matrix generating unit 530 in the pre-coding apparatus shown in FIG. 5. As shown in FIG. 7C, the X-th level of pre-coding matrix generating unit 530 includes a (X−1)th level of pre-coding equivalent channel matrix generating subunit 532-2, a X-th level of pre-coding equivalent channel matrix generating subunit 534-2, and a singular value decomposition subunit 536-2. For example, these subunits may be configured to perform respectively the processing of step S410-2, S420-2 and S430-2 in the method shown in FIG. 4B.

FIG. 7C shows a schematic block view of still another specific implementation for the X-th level of pre-coding matrix generating unit 530 in the pre-coding apparatus shown in FIG. 5. As shown in FIG. 7C, the X-th level of pre-coding matrix generating unit 530 includes a (X−1)-th level of pre-coding equivalent channel matrix generating subunit 532-3, a X-th level of pre-coding equivalent channel matrix generating subunit 534-3, and a codebook searching subunit 536-3. For example, these subunits may be configured to perform respectively the processing of step S410-3, S420-3 and S430-3 in the method shown in FIG. 4C.

The componential section, unit and subunit in the above apparatus may be configured through software, hardware or the combination thereof. The specific means or ways of configuration is well known by those skilled in the art, and the detailed description thereof thus will be omitted.

There is also provided a user equipment according to another embodiment of the invention. The user equipment is equipped with the pre-coding apparatus according to the embodiment of the invention as shown in FIG. 5, and thus can be used to implement the MIMO collaborative communication method according to the embodiment of the invention.

It is easily understood that the wireless communication system including the user equipment according to the another embodiment of the invention should also be deemed to fall within the scope of protection of the invention.

The invention further proposes a program product on which machine readable instruction codes are stored. The instruction codes, when being read and executed by a machine, can cause the machine to perform the method of multi-input multi-output MIMO collaborative communication according to the embodiments of the invention described above.

Correspondingly, a storage medium carrying such program product on which machine readable instruction codes are stored will also be encompassed in the disclosure of the invention. The storage medium includes but is not limited to a soft disk, an optical disk, a magnetooptical disk, a storage card, a storage stick, etc.

In the foregoing description of the embodiments of the invention, a feature described and/or illustrated in connection with one embodiment can be used in the same or similar way in one or more other embodiments in combination with or in place of a feature in the other embodiments.

It shall be emphasized that the terms "include/comprise" as used in this context refer to presence of a feature, an element, a step or a component but will not exclude presence or addition of one or more other features, elements, steps or components.

Furthermore, the method according to the embodiments of the invention will not be performed only in the temporal sequence described in the specification but can also be performed in another temporal sequence, in parallel or separately. Therefore the sequence in which the method is performed as described in this specification shall not constitute a restriction to the scope of the invention.

Although the invention has been disclosed in the foregoing description of the embodiments of the invention, it shall be appreciated that those skilled in the art can devise various modifications, adaptations or equivalents of the invention without departing from the spirit and scope of the invention. These modifications, adaptations or equivalents shall also be constructed as falling into the scope of the invention.

The invention claimed is:

1. A method for multiple-input-multiple-output (MIMO) collaborative communication in a wireless communication system, the wireless communication system including at least one user equipment and M base stations collaboratively communicating with the at least one user equipment, M being an integer greater than or equal to 2, said method comprising:
performing the following processes with respect to each user equipment:
performing a first level of MIMO pre-coding process for each base station, to acquire respective first level of pre-coding matrices corresponding to respective base stations;
performing a second level to X-th level of MIMO pre-coding process sequentially to acquire second level to X-th level of pre-coding matrices of respective base stations, X being an integer greater than or equal to 2, wherein in the X-th level of MIMO pre-coding process, the M base stations is divided into $Q^{(X)}$ groups, and the X-th level of MIMO pre-coding is performed to the $Q^{(X)}$ groups of base stations on the basis of the acquired first level to (X−1)-th level of pre-coding matrices to acquire the X-th level of pre-coding matrix of each base station group in the $Q^{(X)}$ base station groups, $Q^{(X)}$ being an integer greater than or equal to 1 and smaller than or equal to M.

2. The method according to claim 1, wherein the first level MIMO pre-coding process comprises:
dividing antennas of the m-th base station in the M base stations into $K_m$ groups, $K_m$ being an integer greater than or equal to 1 and less than or equal to the number of antenna of the m-th base station; performing a singular value decomposition for a channel matrix $H_{1,m}$ corresponding to each base station to acquire $H_{1,m} = U_{1,m} S_{1,m} V_{1,m}^H$; taking the first $L_{1,m}$ columns in the matrix $V_{1,m}$ as each first level of pre-coding matrix $P_{1,m}$ corresponding to each base station, wherein m=1, 2 . . . , M and indicates the serial number of each base station in the M base stations, $U_{1,m}$ and $V_{1,m}$ are unitary matrices, and $S_{1,m}$ is a diagonal matrix and its diagonal elements are channel gains of the sub-channels for MIMO channel corresponding to the m-th base station, and wherein, "H" in the matrix $V_{1,m}^H$ indicates an operation of Hamiltonian transposition, $L_{1,m}$ indicates the number of equivalent antenna of the $K_m$ antenna groups in the m-th base station, which is an integer greater than or equal to 1 and less than or equal to the number of antenna of the user equipment.

3. The method according to claim 1, wherein the first level MIMO pre-coding process comprises:
dividing antennas of the m-th base station in the M base stations into $K_m$ groups, $K_m$ being an integer greater than or equal to 1 and less than or equal to the number of the antenna of the m-th base station; performing a singular value decomposition for a channel matrix $H_{1,m}$ corresponding to each base station to acquire $H_{1,m} = U_{1,m} S_{1,m} V_{1,m}^H$; mapping a matrix composed of the first $L_{1,m}$ columns in the matrix $V_{1,m}$ into a preset codebook in the wireless communication system, taking a codebook vector acquired by the mapping as each of the first level of pre-coding matrix $P_{1,m}$ corresponding to each base station, wherein m=1, 2 . . . , M and indicates the serial number of each base station in the M base stations, $U_{1,m}$ and $V_{1,m}$ are unitary matrices, and $S_{1,m}$ is a diagonal matrix and its diagonal elements are channel gains of the sub-channels for MIMO channel corresponding to the m-th base station, and wherein, "H" in the matrix $V_{1,m}^H$ indicates an operation of Hamiltonian transposition, $L_{1,m}$ indicates the number of equivalent antenna of the $K_m$ groups of antennas in the m-th base station, which is an integer greater than or equal to 1 and less than or equal to the number of antenna of the user equipment.

4. The method according to claim 3, wherein in the mapping process, performing a correlation operation between the matrix composed of the first $L_{1,m}$ columns in the matrix $V_{1,m}$ and respective pre-coding matrix in the codebook, and taking the pre-coding matrix in the codebook corresponding to the maximum correlation value as each first level of pre-coding matrix $P_{1,m}$ corresponding to each base station.

5. The method according to claim 1, wherein the first level MIMO pre-coding process comprises:
searching, according to a predetermined principle, a preset codebook of the wireless communication system based on a channel matrix $H_{1,m}$ corresponding to each base station, and taking a codebook vector acquired by the searching as each first level of pre-coding matrix $P_{1,m}$ corresponding to each base station, wherein m=1, 2 . . . , M and represents the serial number of each base station in the M base stations.

6. The method according to claim 1, wherein, the X-th level of MIMO pre-coding process comprises:
acquiring an equivalent channel matrix $H_{X-1,\,q}^{(X-1)}$ of a $q^{(X-1)}$-th base station group in the (X−1)-th level of pre-coding though multiplying a pre-coding matrix $P_{X-1,\,q}^{(X-1)}$ for the $q^{(X-1)}$-th base station group in the $Q^{(X-1)}$ base station groups among the acquired (X−1)-th level pre-coding matrix by a channel matrix of the $q^{(X-1)}$-th base station group, wherein $q^{(X-1)}$ is the serial number of each base station group in the $Q^{(X-1)}$ base station groups, which is an integer larger or equal to 1 and smaller than or equal to $Q^{(X-1)}$, and wherein the equivalent channel matrix of the (X−1)-th level pre-coding is represented as $H_{X-1}=[H_{X-1,\,1}\,H_{X-1,\,2}\,\cdots\,H_{X-1,\,Q^{(X-1)}}]$;
dividing the equivalent channel matrix $H_{X-1}$ into $Q^{(X)}$ groups by column, wherein each group is represented as $H_{X,\,q}^{(X)}$ and regarded as a channel matrix corresponding to each base station group in the $Q^{(X)}$ base station groups, the number of columns for each group being greater than or equal to the number of rows for $H_{X-1}$; and
performing a singular value decomposition for the channel matrix $H_{X,\,q}^{(X)}$ to acquire $H_{X,\,q}^{(X)}=U_{X,\,q}^{(X)}S_{X,\,q}^{(X)}V_{X,\,q}^{(X)\,H}$; taking the first $L_{X,\,q}^{(X)}$ columns in the matrix $V_{X,\,q}^{(X)}$ as each X-th level of pre-coding matrix $P_{X,\,q}^{(X)}$ corresponding to the each base station group in the $Q^{(X)}$ base station groups, wherein $q^{(X)}=1, 2 \ldots, Q^{(X)}$ and indicates the serial number for the base station group in the $Q^{(X)}$ groups of base stations acquired by dividing the M base stations in the X-th level of MIMO pre-coding process, $U_{X,\,q}^{(X)}$ and $V_{X,\,q}^{(X)}$ are unitary matrices, and $S_{X,\,q}^{(X)}$ is a diagonal matrix and its diagonal elements are channel gains of sub-channels for the MIMO channel corresponding to the $q^{(X)}$ base station group, and wherein "H" in $V_{X,\,q}^{(X)}$ indicates an operation of Hamiltonian transposition, $L_{X,\,q}^{(X)}$ indicates the number of passages for parallel transmission provided by the channels of the $q^{(X)}$-th group of base station in the $Q^{(X)}$ base station groups in the X-th level of pre-coding, which is an integer greater than or equal to 1 and less than the number of antenna of the user equipment.

7. The method according to claim 6, further comprises:
performing, by the M base stations, a transmission pre-coding process of each base station in multiple-input multiple-output MIMO collaborative communication according to the acquired first level of pre-coding matrix $P_{1,\,m}$ to the X-th level pre-coding matrix $P_{X,\,q}^{(X)}$, to thereby implement the collaborative communication between the at least one user equipment and the M base stations.

8. The method according to claim 7, wherein, the step of performing the MIMO pre-coding process by the M base stations according to the acquired first level of pre-coding matrix $P_{1,\,m}$ to the X-th level of pre-coding matrix $P_{X,\,q}^{(X)}$ comprises:
determining a posterior signal to noise ratio under the action of the current channel and the first level of pre-coding matrix $P_{1,m}$ to the X-th level of pre-coding matrix $P_{X,\,q}^{(X)}$ according to the acquired first level of pre-coding matrix $P_{1,\,m}$ to the X-th level of pre-coding matrix $P_{X,\,q}^{(X)}$ and a channel impulse response of the current channel of the wireless communication system, and selecting one of the various modulation coding schemes (MCS) known by the wireless communication system according to the posterior signal to noise ratio;
notifying at least one of the M base stations of the acquired first level of pre-coding matrix $P_{1,\,m}$ to the X-th level of pre-coding matrix $P_{X,\,q}^{(X)}$ and the selected modulation coding scheme, and transmitting, by the at least one base station, the received information to other corresponding base stations in the M base stations; or notifying respective base stations of the M base stations of the acquired first level of pre-coding matrix $P_{1,\,m}$ to the X-th level of pre-coding matrix $P_{X,\,q}^{(X)}$ and the selected modulation coding scheme, respectively, so that the M base stations complete the transmission pre-coding process for each base station in the MIMO collaborative communication according to the acquired first level of pre-coding matrix $P_{1,\,m}$ to the X-th level of pre-coding matrix $P_{X,\,q}^{(X)}$ corresponding to the each base station.

9. The method according to claim 8, wherein, the first level of pre-coding matrix $P_{1,\,m}$ to the X-th level of pre-coding matrix $P_{X,\,q}^{(X)}$ are acquired through computation by the user equipment, and the at least one base station is notified of the acquired first level of pre-coding matrix $P_{1,\,m}$ to the X-th level of pre-coding matrix $P_{X,\,q}^{(X)}$ and the selected coding modulating scheme by the user equipment through respective signaling channels between the user equipment and the M base stations; or, respective base stations in the M base stations is notified of the acquired first level of pre-coding matrix $P_{1,\,m}$ to the X-th level of pre-coding matrix $P_{X,\,q}^{(X)}$ and the selected coding modulating scheme, respectively, by the user equipment through a corresponding signaling channel between the user equipment and the M base stations, wherein the information between each base station is transmitted through a backhaul link.

10. The method according to claim 9, wherein, the wireless communication system comprises one user equipment, and $K_m=1$, $X=2$, $Q^{(X)}=1$.

11. The method according to claim 1, wherein the X-th level of MIMO pre-coding process comprises:
acquiring an equivalent channel matrix $H_{X-1,\,q}^{(X-1)}$ of the $q^{(X-1)}$-th base station group in the (X−1)-th level of pre-coding through multiplying the pre-coding matrix $P_{X-1,\,q}^{(X-1)}$ for the $q^{(X-1)}$th base station group in the $Q^{(X-1)}$ base station groups among the acquired (X−1)-th level of pre-coding matrix by a the channel matrix of the $q^{(X-1)}$-th base station group, wherein $q^{(X-1)}$ is the serial number for the base station group in the $Q^{(X-1)}$ base station groups, which is an integer larger or equal to 1 and smaller than or equal to $Q^{(X-1)}$ and the equivalent channel matrix of the (X−1)-th level of pre-coding is represented as $H_{X-1}=[H_{X-1,\,1}\,H_{X-1,\,2}\,\cdots\,H_{X-1,\,Q^{(X-1)}}]$;
dividing $H_{X-1}$ into $Q^{(X)}$ groups by column, wherein each group is represented as $H_{X,\,q}^{(X)}$ and regarded as a channel matrix corresponding to each base station group in the $Q^{(X)}$ base station groups, the number of columns for each group being greater than or equal to the number of rows for $H_{X-1}$; and
performing a singular value decomposition for the channel matrix $H_{X,\,q}^{(X)}$ to acquire $H_{X,\,q}^{(X)}=U_{X,\,q}^{(X)}S_{X,\,q}^{(X)}V_{X,\,q}^{(X)\,H}$, mapping a matrix composed of the first $L_{X,\,q}^{(X)}$ columns in the matrix $V_{X,\,q}^{(X)}$ into a preset codebook in the wireless communication system, the codebook vector acquired by the mapping being regarded as each X-th level of pre-coding matrix $P_{X,\,q}^{(X)}$ corresponding to each base station group in the $Q^{(X)}$ base station groups, wherein $q^{(X)}=1, 2 \ldots, Q^{(X)}$ and indicates the serial number for the base station group in the $Q^{(X)}$ base station groups acquired by dividing the M base stations in the X-th level MIMO pre-coding process, $U_{X,q}^{(X)}$ and $V_{X,q}^{(X)}$ are unitary matrices, and $S_{X,q}^{(X)}$ is a diagonal matrix and its diagonal elements are channel gains of sub-channels for the MIMO channel corresponding to the $q^{(X)}$-th base station group, and wherein, "H" in $V_{X,q}^{(X)H}$ indicates an operation of Hamiltonian transposition, $L_{X,q}^{(X)}$ indicates the number of passages for parallel transmission provided by the channels of the $q^{(X)}$-th group of base station in the $Q^{(X)}$ base station groups in the X-th level of pre-coding, which is an integer greater than or equal to 1 and less than the number of antenna of the user equipment.

12. The method according to claim 11, wherein, in the mapping process, performing a correlation operation between the matrix composed of the first $L_{X,q}^{(X)}$ columns in the matrix $V_{X,q}^{(X)}$ and the respective pre-coding matrices in the codebook, and taking the pre-coding matrix in the codebook corresponding to the maximum correlation value as the each X-th level of pre-coding matrix $P_{X,q}^{(X)}$ corresponding to each base station group in the $Q^{(X)}$ base station groups.

13. The method according to claim 1, wherein, the X-th level MIMO pre-coding process comprises:
acquiring an equivalent channel matrix $H_{X-1,q}^{(X-1)}$ of the $q^{(X-1)}$-th base station group in the (X−1)-th level pre-coding through multiplying a pre-coding matrix $P_{X-1,q}^{(X-1)}$ for the $q^{(X-1)}$-th base station group in the $Q^{(X-1)}$ base station groups among the acquired (X−1)-th level of pre-coding matrix by a channel matrix of the $q^{(X-1)}$-th base station group, wherein $q^{(X-1)}$ is the serial number for the base station group in the $Q^{(X-1)}$ base station groups, which is an integer larger or equal to 1 and smaller than or equal to $Q^{(X-1)}$, and the equivalent channel matrix of the (X−1)-th level of pre-coding is represented as $H_{X-1} = [H_{X-1,1}\ H_{X-1,2}\ \ldots\ H_{X-1,Q^{(X-1)}}]$;
dividing $H_{X-1}$ into $Q^{(X)}$ groups by column, wherein each group is represented as $H_{X-1,q}^{(X)}$ and regarded as a channel matrix corresponding to each base station group in the $Q^{(X)}$ base station groups, the number of columns for each group being greater than or equal to the number of rows for $H_{X-1}$; and
searching, according to a predetermined principle, a preset codebook of the wireless communication system in accordance with the channel matrix $H_{X,q}^{(X)}$, a codebook vector acquired by the searching being regarded as each X-th level of pre-coding matrix $P_{X,q}^{(X)}$ corresponding to each base station group in the $Q^{(X)}$ base station groups.

14. A MIMO pre-coding apparatus used in a wireless communication system for performing multiple-input-multiple-output (MIMO) collaborative communication, the wireless communication system including at least one user equipment and M base stations collaboratively communicating with the at least one user equipment, M being an integer greater than or equal to 2, for each user equipment, said MIMO pre-coding apparatus including:
a first pre-coding matrix generating unit configured to perform a first level of MIMO pre-coding process for each base station to acquire respective first level of pre-coding matrices corresponding to respective base stations; and
a second to X-th level of pre-coding matrix generating unit configured to perform a second level to X-th level of MIMO pre-coding process sequentially to acquire a second level to X-th level of pre-coding matrices of respective base stations, X being an integer greater than or equal to 2, wherein the second to X-th level pre-coding matrix generating unit comprises a X-th level of pre-coding matrix generating section configured to: divide the M base stations into $Q^{(X)}$ groups, and perform the X-th level of MIMO pre-coding to the $Q^{(X)}$ groups of base stations on the basis of the acquired first level to (X−1)-th level of pre-coding matrices to acquire the X-th level pre-coding matrix of each group of base station in the $Q^{(X)}$ groups of base stations, $Q^{(X)}$ being an integer greater than or equal to 1 and smaller than or equal to M.

15. The MIMO pre-coding apparatus according to claim 14, wherein, the first level pre-coding matrix generating unit comprises:
an antenna grouping subunit configured to divide the antennas of the m-th base station in the M base stations to $K_m$ groups, wherein $K_m$ is an integer being greater than or equal to 1 and less than or equal to the number of the antennas in the m-th base station; and
a singular value decomposition subunit configured to perform a singular value decomposition for a channel matrix $H_{1,m}$ corresponding to each base station to acquire $H_{1,m} = U_{1,m} S_{1,m} V_{1,m}^H$, taking the first $L_{1,m}$ columns in the matrix $V_{1,m}$ as each first level of pre-coding matrix $P_{1,m}$ corresponding to each base station, wherein m=1, 2 . . . , M and indicates the serial number of each base station in the M base stations, $U_{1,m}$ and $V_{1,m}$ are unitary matrices, and $S_{1,m}$ is a diagonal matrix and its diagonal elements are channel gains of the sub-channels for MIMO channel corresponding to the m-th base station, and wherein, "H" in $V_{1,m}^H$ indicates an operation of Hamiltonian transposition, $L_{1,m}$ indicates the number of equivalent antenna of the $K_m$ antenna groups in the m-th base station, which is an integer greater than or equal to 1 and less than or equal to the number of antenna of the user equipment.

16. The MIMO pre-coding apparatus according to claim 14, wherein, the first level pre-coding matrix generating unit comprises:
an antenna grouping subunit configured to divide the antennas of the m-th base station in the M base stations to $K_m$ groups, wherein $K_m$ is an integer being greater than or equal to 1 and less than or equal to the number of the antennas in the m-th base station; and
a codebook mapping subunit configured to perform an operation of singular value decomposition for a channel matrix $H_{1,m}$ corresponding to each base station to acquire $H_{1,m} = U_{1,m} S_{1,m} V_{1,m}^H$, and map a matrix composed of the first $L_{1,m}$ columns in the matrix $V_{1,m}$ into a preset codebook in the wireless communication system, a codebook vector acquired by the mapping being taken as each first level of pre-coding matrix $P_{1,m}$ corresponding to each base station, wherein m=1, 2 . . . , M and indicates the serial number of each base station in the M base stations, $U_{1,m}$ and $V_{1,m}$ are unitary matrices, and $S_{1,m}$ is a diagonal matrix and its diagonal elements are channel gains of sub-channels for MIMO channel corresponding to the m-th base station, and wherein, "H" in $V_{1,m}^H$ indicates an operation of Hamiltonian transposition, $L_{1,m}$ indicates the number of equivalent antenna of the $K_m$ antenna groups in the m-th base station, which is an integer greater than or equal to 1 and less than or equal to the number of antenna of the user equipment.

17. The MIMO pre-coding apparatus according to claim 16, wherein, the codebook mapping subunit is configured to perform a correlation operation between the matrix composed of the first $L_{1,m}$ columns in the matrix $V_{1,m}$ and respective pre-coding matrix in the codebook, and take the pre-coding matrix in the codebook corresponding to the maximum correlation value as each first level of pre-coding matrix $P_{1,m}$ corresponding to each base station.

18. The MIMO pre-coding apparatus according to claim 14, wherein, the first level pre-coding matrix generating unit comprises:
a codebook searching subunit configured to search, according to a predetermined principle, a preset codebook of the wireless communication system based on a channel matrix $H_{1,m}$ corresponding to each base station, and take a codebook vector acquired by the searching as each first level of pre-coding matrix $P_{1,m}$ corresponding to each base station, wherein m=1, 2 . . . , M, which represents the serial number of each base station in the M base stations.

19. The MIMO pre-coding apparatus according to claim 14, wherein, the X-th level of MIMO pre-coding matrix generating section comprises:
an (X−1)-th level of pre-coding equivalent channel matrix generating sub-section configured to acquire an equivalent channel matrix $H_{X-1, q}^{(X-1)}$ of a $q^{(X-1)}$-th base station group in the (X−1)-th level pre-coding through multiplying a pre-coding matrix $P_{X-1, q}^{(X-1)}$ for the $q^{(X-1)}$-th base station group in the $Q^{(X-1)}$ base station groups among the acquired (X−1)-th level of pre-coding matrix by a channel matrix of the $q^{(X-1)}$-th base station group, wherein $q^{(X-1)}$ is the serial number of each base station group in the $Q^{(X-1)}$ base station groups, which is an integer larger or equal to 1 and smaller than or equal to $Q^{(X-1)}$, and wherein the equivalent channel matrix of the (X−1)-th level of pre-coding is represented as $H_{X-1} = [H_{X-1, 1} \ H_{X-1, 2} \ldots H_{X-1, Q}^{(X-1)}]$;
X-th level of pre-coding channel matrix generating sub-section configured to divide the equivalent channel matrix $H_{X-1}$ into $Q^{(X)}$ groups by column, wherein each group is represented as $H_{X, q}^{(X)}$ and regarded as a channel matrix $H_{X, q}^{(X)}$ corresponding to each base station group in the $Q^{(X)}$ base station groups, the number of columns for each group being greater than or equal to the number of rows for $H_{X-1}$; and
a singular value decomposition sub-section configured to perform a singular value decomposition for the channel matrix $H_{X, q}^{(X)}$ to acquire $H_{X, q}^{(X)} = U_{X, q}^{(X)} S_{X, q}^{(X)} V_{X, q}^{(X)H}$, and take the first $L_{X, q}^{(X)}$ columns in the matrix $V_{X, q}^{(X)}$ as each X-th level pre-coding matrix $P_{X, q}^{(X)}$ corresponding to the each base station group in the $Q^{(X)}$ base station groups, wherein $q^{(X)}$=1, 2 . . . , $Q^{(X)}$ and indicates the serial number for the base station group in the $Q^{(X)}$ groups of base stations acquired by dividing the M base stations in the X-th level of MIMO pre-coding process, $U_{X, q}^{(X)}$ and $V_{X, q}^{(X)}$ are unitary matrices, and $S_{X, q}^{(X)}$ is a diagonal matrix and its diagonal elements are channel gains of sub-channels for the MIMO channel corresponding to the $q^{(X)}$ base station group, and wherein, "H" in $V_{X, q}^{(X)H}$ indicates an operation of Hamiltonian transposition, $L_{X, q}^{(X)}$ indicates the number of passages for parallel transmission provided by the channel of the $q^{(X)}$-th group of base station in the $Q^{(X)}$ base station groups in the X-th level of pre-coding, which is an integer greater than or equal to 1 and less than the number of antenna of the user equipment.

20. The MIMO pre-coding apparatus according to claim 19, further comprises:
a pre-coding matrix applying unit configured to perform a transmission pre-coding process to corresponding base station according to the acquired first level of pre-coding matrix $P_{1, m}$ to the X-th level of pre-coding matrix $P_{X, q}^{(X)}$, to thereby implement the MIMO collaborative communication between the at least one user equipment and the M base stations.

21. The MIMO pre-coding apparatus according to claim 20, wherein, the pre-coding matrix applying unit comprises:
a modulation coding scheme generating subunit configured to determine a posterior signal to noise ratio under the action of the current channel and the first level of pre-coding matrix $P_{1, m}$ to the X-th level of pre-coding matrix $P_{X, q}^{(X)}$ according to the acquired first level of pre-coding matrix $P_{1, m}$ to the X-th level of pre-coding matrix $P_{X, q}^{(X)}$ and a channel impulse response of the current channel of the wireless communication system, and select one of the various modulation coding schemes (MCS) known by the wireless communication system according to the posterior signal to noise ratio;
a information transmitting subunit configured to make at least one of the M base stations notified of the acquired first level of pre-coding matrix $P_{1, m}$ to the X-th level of pre-coding matrix $P_{X, q}^{(X)}$ and the selected modulation coding scheme, wherein the received information is transmitted to other corresponding base stations in the M base stations by the at least one base station being notified of the first level of pre-coding matrix $P_{1, m}$ to the X-th level of pre-coding matrix $P_{X, q}^{(X)}$ and the selected modulation coding scheme; or, make respective base stations of the M base stations notified of the acquired first level of pre-coding matrix $P_{1, m}$ to the X-th level of pre-coding matrix $P_{X, q}^{(X)}$ and the selected modulation coding scheme, respectively, so that the M base stations complete the transmission pre-coding process for each base station in the MIMO collaborative communication according to the acquired first level of pre-coding matrix $P_{1, m}$ to the X-th level of pre-coding matrix $P_{X, q}^{(X)}$ corresponding to the each base station, wherein the information between each base station is transmitted through a backhaul link.

22. The MIMO pre-coding apparatus according to claim 21, wherein, the wireless communication system comprises one user equipment, and $K_m$=1, X=2, $Q^{(X)}$=1.

23. The MIMO pre-coding apparatus according to claim 14, the Xth level MIMO pre-coding matrix generating section comprises:
(X−1)-th level of pre-coding equivalent channel matrix generating sub-section configured to acquire an equivalent channel matrix $H_{X-1, q}^{(X-1)}$ of the $q^{(X-1)}$-th base station group in the (X−1)-th level of pre-coding through multiplying the pre-coding matrix $P_{X-1, q}^{(X-1)}$ for the $q^{(X-1)}$-th base station group in the $Q^{(X-1)}$ base station groups among the acquired (X−1)-th level pre-coding matrix by a channel matrix of the $q^{(X-1)}$-th base station group, wherein $q^{(X-1)}$ is the serial number for the base station group in the $Q^{(X-1)}$ base station groups, which is an integer larger or equal to 1 and smaller than or equal to $Q^{(X-1)}$, and the equivalent channel matrix of the (X−1)-th pre-coding is represented as $H_{X-1} = [H_{X-1, 1} \ H_{X-1, 2} \ldots H_{X-1, Q}^{(X-1)}]$,
an X-th level of pre-coding channel matrix generating sub-section configured to divide $H_{X-1}$ into $Q^{(X)}$ groups by column, wherein each group is represented as $H_{X, q}^{(X)}$ and regarded as a channel matrix corresponding to each base station group in the $Q^{(X)}$ base station groups, the number of columns for each group being greater than or equal to the number of rows for $H_{X-1}$; and
a codebook mapping sub-section configured to, perform a singular value decomposition for the channel matrix $H_{X, q}^{(X)}$ to acquire $H_{X, q}^{(X)} = U_{X, q}^{(X)} S_{X, q}^{(X)} V_{X, q}^{(X)H}$, and map the matrix composed of the first $L_{X, q}^{(X)}$ columns in the matrix $V_{X, q}^{(X)}$ into a preset codebook in the wireless communication system, the codebook vector acquired by the mapping being regarded as the each X-th level of pre-coding matrix $P_{X,q}^{(X)}$ corresponding to each base station group in the $Q^{(X)}$ base station groups, wherein $q^{(X)}=1, 2 \ldots, Q^{(X)}$ and indicates the serial number for the base station group in the $Q^{(X)}$ base station groups acquired by dividing the M base stations in the X-th level of MIMO pre-coding process, $U_{X,q}^{(X)}$ and $V_{X,q}^{(X)}$ are unitary matrices, and $S_{X,q}^{(X)}$ is a diagonal matrix and its diagonal elements are channel gains of sub-channels for the MIMO channel corresponding to the $q^{(X)}$ base station group, and wherein, "H" in $V_{X,q}^{(X)H}$ indicates an operation of Hamiltonian transposition, $L_{X,q}^{(X)}$ indicates the number of passages for parallel transmission provided by the channel of the $q^{(X)}$-th group of base station in the $Q^{(X)}$ base station groups in the X-th level of pre-coding, which is an integer greater than or equal to 1 and less than the number of antenna of the user equipment.

24. The MIMO pre-coding apparatus according to claim 23, wherein the codebook mapping sub-section is configured to perform a correlation operation between the matrix composed of the first $L_{X,q}^{(X)}$ columns in the matrix $V_{X,q}^{(X)}$ and the respective pre-coding matrices in the codebook, and take the pre-coding matrix in the codebook corresponding to the maximum correlation value as the each X-th level of pre-coding matrix $P_{X,q}^{(X)}$ corresponding to each base station group in the $Q^{(X)}$ base station groups.

25. The MIMO pre-coding apparatus according to claim 14, wherein, the X-th level of MIMO pre-coding matrix generating section comprises:
an (X−1)-th level of pre-coding equivalent channel matrix generating sub-section configured to acquire an equivalent channel matrix $H_{X-1,q}^{(X-1)}$ of the $q^{(X-1)}$-th base station group in the (X−1)-th level pre-coding through multiplying a pre-coding matrix $P_{X-1,q}^{(X-1)}$ for the $q^{(X-1)}$-th base station group in the $Q^{(X-1)}$ base station groups among the acquired (X−1)-th level of pre-coding matrix by a channel matrix of the $q^{(X-1)}$-th base station group, wherein $q^{(X-1)}$ is the serial number for the base station group in the $Q^{(X-1)}$ base station groups, which is an integer larger or equal to 1 and smaller than or equal to $Q^{(X-1)}$, and the equivalent channel matrix of the (X−1)-th level of pre-coding is represented as $H_{X-1} = [H_{X-1,1}\ H_{X-1,2} \ldots H_{X-1,Q^{(X-1)}}]$;

an X-th level of pre-coding channel matrix generating sub-section configured to divide $H_{X-1}$ into $Q^{(X)}$ groups by column, wherein each group is represented as $H_{X,q}^{(X)}$ and regarded as a channel matrix corresponding to each base station group in the $Q^{(X)}$ base station groups, and the number of columns for each group is greater than or equal to the number of rows for $H_{X-1}$; and a codebook searching sub-section configured to search, according to a predetermined principle, a preset codebook of the wireless communication system in accordance with the channel matrix $H_{X,q}^{(X)}$, a codebook vector acquired by the searching being regarded as each X-th level of pre-coding matrix $P_{X,q}^{(X)}$ corresponding to each base station group in the $Q^{(X)}$ of base station groups.

26. A user equipment equipped with a MIMO pre-coding apparatus according to claim 14.

27. A wireless communication system for performing multiple-input multiple-output (MIMO) collaborative communication, the wireless communication system comprising:
at least one user equipment according to claim 26; and
M base stations for collaboratively communicating with the at least one user equipment, M being an integer greater than or equal to 2.

* * * * *